US009778746B2

(12) United States Patent
Keller et al.

(10) Patent No.: US 9,778,746 B2
(45) Date of Patent: Oct. 3, 2017

(54) TRANSVERSAL ACTUATOR FOR HAPTIC FEEDBACK

(71) Applicant: Oculus VR, LLC, Menlo Park, CA (US)

(72) Inventors: Sean Jason Keller, Kirkland, WA (US); Tristan Thomas Trutna, Seattle, WA (US); Ravish Mehra, Redmond, WA (US); Christoph Omid Hohnerlein, Berlin (DE); Elia Gatti, Redmond, WA (US); Riccardo DeSalvo, Pasadena, CA (US); David R. Perek, Bellevue, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 15/275,112

(22) Filed: Sep. 23, 2016

(65) Prior Publication Data

US 2017/0092086 A1    Mar. 30, 2017

Related U.S. Application Data

(60) Provisional application No. 62/232,824, filed on Sep. 25, 2015, provisional application No. 62/232,815, filed on Sep. 25, 2015.

(51) Int. Cl.
*H04B 3/36* (2006.01)
*G06F 3/01* (2006.01)
(Continued)

(52) U.S. Cl.
CPC .............. *G06F 3/016* (2013.01); *G06F 3/011* (2013.01); *G06T 19/006* (2013.01); *G08B 6/00* (2013.01)

(58) Field of Classification Search
CPC   G06F 3/016; G06F 3/041; G08B 6/00; G08B 13/10; A63B 2024/0025;
(Continued)

(56) References Cited

U.S. PATENT DOCUMENTS 5,913,727 A * 6/1999 Ahdoot .................. A63F 13/06
345/156
RE37,528 E * 1/2002 Hannaford ............... B25J 9/106
318/568.11
(Continued)

OTHER PUBLICATIONS

Armel, K.C. et al., "Projecting Sensations to External Objects: Evidence from Skin Conductance Response," Proceedings of the Royal Society of London B: Biological Sciences, 2003, pp. 1499-1506, vol. 270.
(Continued)

*Primary Examiner* — Emily C Terrell
(74) *Attorney, Agent, or Firm* — Fenwick & West LLP

(57) ABSTRACT

An actuator configured to provide haptic feedback to a user. The actuator is located on a plate and is configured to apply various excitations to the plate to generate a mechanical wave propagating in the controlled direction. The excitations can be a translational motion of the actuator (or a portion of the actuator) in two or three perpendicular axes. Alternatively, the excitations can be a non-translational motion (e.g., rotation about an axis) of the actuator (or a portion of the actuator). By generating the mechanical wave traveling in the controlled direction, loss of energy due to scattering of the mechanical wave can be obviated.

18 Claims, 4 Drawing Sheets

(51) Int. Cl.
*G06T 19/00* (2011.01)
*G08B 6/00* (2006.01)

(58) Field of Classification Search
CPC .... A63B 2024/0065; A63B 2024/0068; A63B 2071/0663; A63B 2220/12; A63B 2220/30; A63B 2220/40; A63B 2220/62; A63B 2225/50; A63B 24/0021; A63B 24/0059; A63B 24/0062; A63B 69/0028; A63B 71/06; A63B 71/0686
USPC ................................ 340/407.1, 3.1; 345/633
See application file for complete search history.

(56) References Cited

U.S. PATENT DOCUMENTS

| | | | |
|---|---|---|---|
| 8,502,792 B2* | 8/2013 | Anastas | G06F 3/016 178/18.04 |
| 2004/0133366 A1 | 7/2004 | Sullivan et al. | |
| 2005/0237314 A1* | 10/2005 | Ryynanen | G06F 1/1613 345/184 |
| 2006/0209019 A1* | 9/2006 | Hu | G06F 3/016 345/156 |
| 2008/0132313 A1 | 6/2008 | Rasmussen et al. | |
| 2009/0010468 A1 | 1/2009 | Oser et al. | |
| 2010/0308982 A1* | 12/2010 | Cooperstock | G06F 3/011 340/407.1 |
| 2013/0002341 A1* | 1/2013 | Maier | G06F 3/03548 327/510 |
| 2013/0076652 A1* | 3/2013 | Leung | G06F 3/016 345/173 |
| 2013/0093577 A1 | 4/2013 | Park et al. | |
| 2013/0116852 A1 | 5/2013 | Dijk et al. | |
| 2013/0154813 A1 | 6/2013 | Gosline et al. | |

OTHER PUBLICATIONS

Baalman, M., "How to Control 840 Channels—Working with Large Scale Wave Field Synthesis," Next Generation 2007: Musik im Raum. ZKM—Institut fur Musik und Akustik, 2007, pp. 52-56.
Baalman, M.A.J., "On Wave Field Synthesis and Electro-Acoustic Music, with a Particular Focus on the Reproduction of Arbitrarily Shaped Sound Sources," Ph.D. Dissertation, University of Berlin, 2008, 267 pages.
Berkhout, A.J., "A Holographic Approach to Acoustic Control," Journal of the Audio Engineering Society, 1988, pp. 977-995, vol. 36, No. 12.
Bolanowski, S. J. et al., "Four Channels Mediate the Mechanical Aspects of Touch," The Journal of the Acoustical Society of America, Nov. 1988, 1680-1694, vol. 84, No. 5.
Boone, M.M., "Acoustic Rendering with Wave Field Synthesis," Proceedings of the ACM Siggraph and Euro Graphics Campfire: Acoustic Rendering for Virtual Environments, Snowbird, Utah, 2001, 9 pages.
Brandenburg, K. et al., "Wave Field Synthesis: From Research to Applications," 12th European Signal Processing Conference, IEEE, 2004, pp. 1369-1376.
Brink, M.C., "The Acoustic Representation of Bending Waves," M.Sc. Thesis, Laboratory of Acoustic Imaging and Sound Control, Delft University of Technology, 2002, 81 pages.
Chang, A. et al., "Audio-Haptic Feedback in Mobile Phones," CHI '05 Extended Abstracts on Human Factors in Computing Systems (CHI EA '05), ACM, New York, NY, USA, 2005, pp. 1264-1267.
Danieau, F. et al., "Framework for Enhancing video viewing experience with haptic effects of motion," IEEE Haptics Symposium (HAPTICS), 2012, pp. 541-546.
De Vries, D. et al., "Wave Field Synthesis and Analysis Using Srray Technology," 1999 IEEE Workshop on Applications of Signal Processing to Audio and Acoustics, IEEE, Oct. 17-20, 1999, pp. 15-18.
Diller, T.T., "Frequency Response of Human Skin in Vivo lo Mechanical Stimulation," Thesis, Massachusetts Institute of Technology, Feb. 2001, 85 pages.
Dindar, N. et al., "Immersive Haptic Interaction with Media," 2010 6 pages.
Dreyer, D.A., "Factors Influencing Cutaneous Directional Sensitivity," Sensory Processes Mar. 1978, pp. 71-79, vol. 2, No. 2.
Ertan, S. et al., "A Wearable Haptic Navigation Guidance System," Second International Symposium on Wearable Computers, Digest of Papers, IEEE, 1998, pp. 164-165.
Fohl, W., "The Wave Field Synthesis Lab at the HAW Hamburg," Sound-Perception-Performance, Springer, 2013, pp. 243-255.
Gardner, E.P. et al., "Discrimination of the Direction of Motion on the Human Hand: a Psychophysical Study of Stimulation Parameters," Journal of Neurophysiology Jun. 1994, pp. 2414-2429, vol. 71, No. 6.
Gautier, F. et al, "Experimental Investigation of the Acoustic Black Hole Effect for Vibration Damping in Elliptical Plates," Journal of the Acoustical Society of America, Acoustics '08, Jun. 29-Jul. 4, 2008, p. 3318, vol. 123, No. 5.
Gaw, D. et al., "Haptically Annotated Movies: Reaching Out and Touching the Silver Screen," 14$^{th}$ Symposium on Haptic Interfaces for Virtual Environment and Teleoperator Systems, Mar. 25-26, 2006, pp. 287-288.
Gleeson, B.T. et al., "Communication of Direction Through Lateral Skin Stretch at the Fingertip," Third Joint EuroHaptics Conference and Symposium on Haptic interfaces for Virtual Environment and Teleoperator Systems. World Haptics, Mar. 18-20, 2009, pp. 172-177.
Goertz, A. et al., "Entwicklung eines achtkanaligen Lautsprechermoduls fur die Wellenfeldsynthese," DAGA 2007, Stuttgart, 2007, pp. 681-682. [with machine translation].
Hohnerlein, C., "Coloration of Virtual Sources in Wave Field Synthesis for Different Loudspeaker Spacings," Bachelor's Thesis. Technical University of Berlin, Nov. 4, 2013, 56 pages.
Hoshi, T. et al., "Noncontact Tactile Display Based on Radiation Pressure of Airborne Ultrasound," IEEE Transactions on Haptics, Jul.-Sep. 2010, pp. 155-165, vol. 3, No. 3.
Israr, A. et al., "Control Space of Apparent Haptic Motion," World Haptics Conference (WHC), 2011 IEEE, IEEE, pp. 457-462.
Jack, R. et al., "Designing Tactile Musical Devices with and for Deaf Users: a Case Study," Proceedings of the International Conference on the Multimodal Experience of Music, 2015, 7 pages.
Johansson, R.S. et al., "Responses of Mechanoreceptive Afferent Units in the Glabrous Skin of the Human Band to Sinusoidal Skin Displacements," Brain Research, 1982, pp. 17-25, vol. 244, No. 1.
Kaltenbranner, M. et al., "The reactable: A Collaborative Musical Instrument," 15th IEEE International Workshops on Enabling Technologies: Infrastructure for Collaborative Enterprises, WETICE'06, IEEE, 2006, pp. 406-411.
Kirman, J.H., "Tactile Apparent Movement: The Effects of Interstimulus Onset Interval and Stimulus Duration," Perception and Psychophysics, 1974, pp. 1-6, vol. 15, No. 1.
Krylov, V.V. et al. "Acoustic 'Black Holes' for Flexural Waves as Effective Vibration Dampers," Journal of Sound and Vibration, 2004, pp. 605-619, vol. 274, No. 3.
Krylov, V.V., "Acoustic Black Holes: Recent Developments in the Theory and Applications," IEEE Transactions on Ultrasonics, Ferroelectrics, and Frequency Control, Aug. 2014, pp. 1296-1306, vol. 61, No. 8.
Kyung, K.-U. et al., "Perceptual and Biomechanical Frequency Response of Human Skin: Implication for Design of Tactile Displays," Proceedings of the First Joint Eurohaptics Conference and Symposium on Haptic Interfaces for Virtual Environment and Teleoperator Systems, IEEE, 2005, pp. 96-101.
Lemmens, P., "A Body-Conforming Tactile Jacket to Enrich Movie Viewing," Third Joint EuroHaptics Conference and Symposium on Haptic interfaces for Virtual Environment and Teleoperator Systems, World Haptics, Mar. 18-20, 2009, pp. 7-12.
Makino, Y. et al., "HaptoClone (Haptic-Optical Clone): Mid-air Haptic-Optical Human-Human Interaction with Perfect Synchronization," Proceedings of the 3rd ACM Symposium on Spatial User Interaction, SUI 2015, ACM, Aug. 8-9, 2015, p. 139.

(56) References Cited

OTHER PUBLICATIONS

Malgoezar, A.N.M., "Reflection and Transmission of Plane Acoustic Waves on a Nonlinear Interface," Master Thesis, Delft University of Technology, 2012, 61 pages.

Marquardt, N. et al., "The Haptic Tabletop Puck: Tactile Feedback for Interactive Tabletops," Proceedings of the ACM International Conference on Interactive Tabletops and Surfaces, ACM, 2009, pp. 85-92.

Morioka, M. et al., "Perception Thresholds for Vertical Vibration at the Hand, Seat and Foot," Proceedings of the European Acoustic Association from Acusticum, 2005, pp. 1577-1582.

Muller, S. et al., "Transfer-Function Measurement with Sweeps," Journal of the Audio Engineering Society, Jun. 2001, pp. 443-471, vol. 49, No. 6.

Nanayakkara, S.C. et al., "Enhancing Musical Experience for the Hearing-Impaired Using Visual and Haptic Displays," Human-Computer Interaction, 2013, pp. 115-160, vol. 28, No. 2.

Norrsell, U. et al., "Human, Tactile, Directional Sensibility and its Peripheral Origins," Acta physiologica Scandinavica, Feb. 1992, pp. 155-161, vol. 144, No. 2.

Okamura, A.M. et al., J. "Vibration Feedback Models for Virtual Environments," Proceedings. 1998 IEEE International Conference on Robotics and Automation, 1998, p. 674-679, vol. 1.

Olausson, H., "The Influence of Spatial Summation on Human Tactile Directional Sensibility," Somatosensory & motor research, 1994, pp. 305-310, vol. 11, No. 4.

Puckette, M.S. et al., "Real-Time Audio Analysis Tools for Pd and MSP," 1998, 4 pages.

Schirmer, M. et al., "Shoe me the Way: A Shoe-Based Tactile Interface for Eyes-Free Urban Navigation," Proceedings of the 17th international Conference on Human-Computer Interaction with Mobile Devices and Services, MobileHCI'15, ACM, Aug. 24-27, 2015, pp. 327-336.

Schlee, G., "Quantitative Assessment of Foot Sensitivity: The Effects of Foot Sole Skin Temperature, Blood Flow at the Foot Area and Footwear," Doctoral Thesis, Chemnitz University of Technology, Apr. 2010, 95 pages.

Sharma, A., Lechal: A Haptic Feedback Based Navigation Shoe (for the blind), 2011, 6 pages, May be retrieved at<URL:http://anirudh.me/2011/06/le-chal-a-haptic-feedback-based-shoe-for-the-blind/>.

Smith, J. et al., "Communicating EmotionThrough a Haptic Link: Design Space and Methodology," International Journal of Human-Computer Studies, 2007, pp. 376-387, vol. 65, No. 4.

Sodhi, R. et al., "AIREAL: Interactive Tactile Experiences in Free Air," ACM Transactions on Graphics (TOG), 2013, pp. 134:1-134:10, vol. 32, No. 4.

Spors, S. et al., "The Theory of Wave Field Synthesis Revisited," 124th Convention of the Audio Engineering Society, May 17-20, 2008, 11 pages.

Spors, S. et al., "Physical and Perceptual Properties of Focused Sources in Wave Field Synthesis," 127th Audio Engineering Society Convention, 2009, pp. 1036-1054.

Spors, S.M., "Active Listening Room Compensation for Spatial Sound Reproduction Systems," Ph.D. Dissertation, University of Erlangen-Nurenberg, 2005, 293 pages.

Talbot, W. H., "The Sense of Flutter-Vibration: Comparison of the Human Capacity with Response Patterns of Mechanoreceptive Afferents from the Monkey Hand ," Journal of Neurophysiology, 1968, pp. 301-334, vol. 31, No. 2.

Tan, H.Z. et al., "A Haptic Back Display for Attentional and Directional Cueing," Haptics-e, Jun. 2003, pp. 1-20, vol. 3, No. 1.

Weiss, M. et al., "FingerFlux: Near-Surface Haptic Feedback on Tabletops," Proceedings of the $24^{th}$ Annual ACM Symposium on User Interface Software and Technology, UIST'11, ACM, Oct. 16-19, 2011, pp. 615-620.

Wierstorf, H. et al., "Sound Field Synthesis Toolbox," 132nd Convention of the Audio Engineering Society, 2012, 4 pages.

Witmer, B.G. et al., "Measuring Presence in Virtual Environments: A Presence Questionnaire," Presence, 1998, pp. 225-240, vol. 7, No. 3.

Yannier, N. et al., "FeelSleeve: Haptic Feedback to Enhance Early Reading," In Proc. of CHI 2015, ACM, Apr. 18-23, 2015, 10 pages.

Zhao, S. et al., "Intermanual Apparent Tactile Motion on Handheld Tablets," 2015 IEEE World Haptics Conference (WHC), IEEE, Jun. 22-26, 2015, pp. 241-247.

PCT International Search Report and Written Opinion, PCT Application No. PCT/US2016/053561, dated Jan. 17, 2017, 12 pages.

Ryu, J. et al., "A Survey of Haptic Control Technology," Transactions of the Korean Society of Mechanical Engineers, 2009, pp. 283-295, vol. 33, No. 4.

* cited by examiner

TRANSVERSAL ACTUATOR FOR HAPTIC FEEDBACK

CROSS REFERENCE TO RELATED APPLICATIONS

This application claims priority to and the benefit of U.S. Provisional Patent Application No. 62/232,824 filed on Sep. 25, 2015 and U.S. Provisional Patent Application No. 62/232,815 filed on Sep. 25, 2015, which are incorporated by reference in their entirety.

BACKGROUND

The present disclosure generally relates to a system for presenting a virtual reality experience to a user, and specifically to an actuator for providing haptic feedback to the user.

A virtual reality system enables a user to experience a virtual reality. The virtual reality system creates a virtual world, and presents a three-dimensional (3-D) image of the virtual world to a user. The virtual reality system updates the visual illustration of the virtual world according to a user's movement, so that the user can visually experience the virtual world. The virtual reality system can also provide haptic feedback to the user. Specifically, the virtual reality system provides to the user haptic feedback that the user can sense in conjunction with the 3-D image of the virtual world to amplify the virtual reality experience.

In one example, the virtual reality system implements actuators providing haptic feedback that a user can sense. Actuators coupled to an edge of a haptic surface can vibrate, for example through an up and down excitation, to generate a wave to provide haptic feedback to the user. However, the wave generated by the actuators vibrating through the simple up and down excitation is scattered omni-directionally rather than being propagated in a controlled (or desired) direction toward the user. Therefore, there is a loss of energy delivered to the user on the haptic surface. Moreover, damping elements may need to be implemented to reduce reflections of waves propagated in untargeted directions.

SUMMARY

Embodiments relate to an actuator configured to generate a mechanical wave that propagates through a plate. The plate may be a haptic mat on which a user can stand on. The actuator comprises: a first magnet having a pole, the first magnet coupled to the plate; and a first body, the first body comprising: a first elongated member, a first end of the first elongated member facing a first surface of the first magnet, a second end of the first elongated member facing a second surface of the first magnet, a first coil coupled to the first end of the first elongated member, and a second coil coupled to the second end of the first elongated member. The first elongated member may include a material which forms a medium with a magnetic permeability within a predetermined range for directing magnetic flux. The first coil and the second coil are configured to be driven with a first electric current and a second electric current, respectively, that together induce a magnetic field within the first elongated member to cause a motion of the first magnet relative to the first body, the motion of the first magnet generating some or all of the wave within the plate.

In one or more embodiments, the actuator further comprises: a second magnet having another pole, the second magnet coupled to the plate; and a second body, the second body comprising: a second elongated member, a first end of the second elongated member facing a first surface of the second magnet, a second end of the second elongated member facing a second surface of the second magnet, a third coil coupled to the first end of the second elongated member, and a fourth coil coupled to the second end of the second elongated member. The third coil and the fourth coil may be configured to be driven with a third electric current and a fourth electric current, respectively, that together induce another magnetic field within the second elongated member to cause a motion of the second magnet relative to the second body, the motion of the second magnet together with the motion of the first magnet generating some or all of the wave within the plate. A third end of the first body away from the first magnet may be coupled to a third end of the second body away from the second magnet. The first body and the second body may be coupled to each other to form a ferrite.

Figure 1:
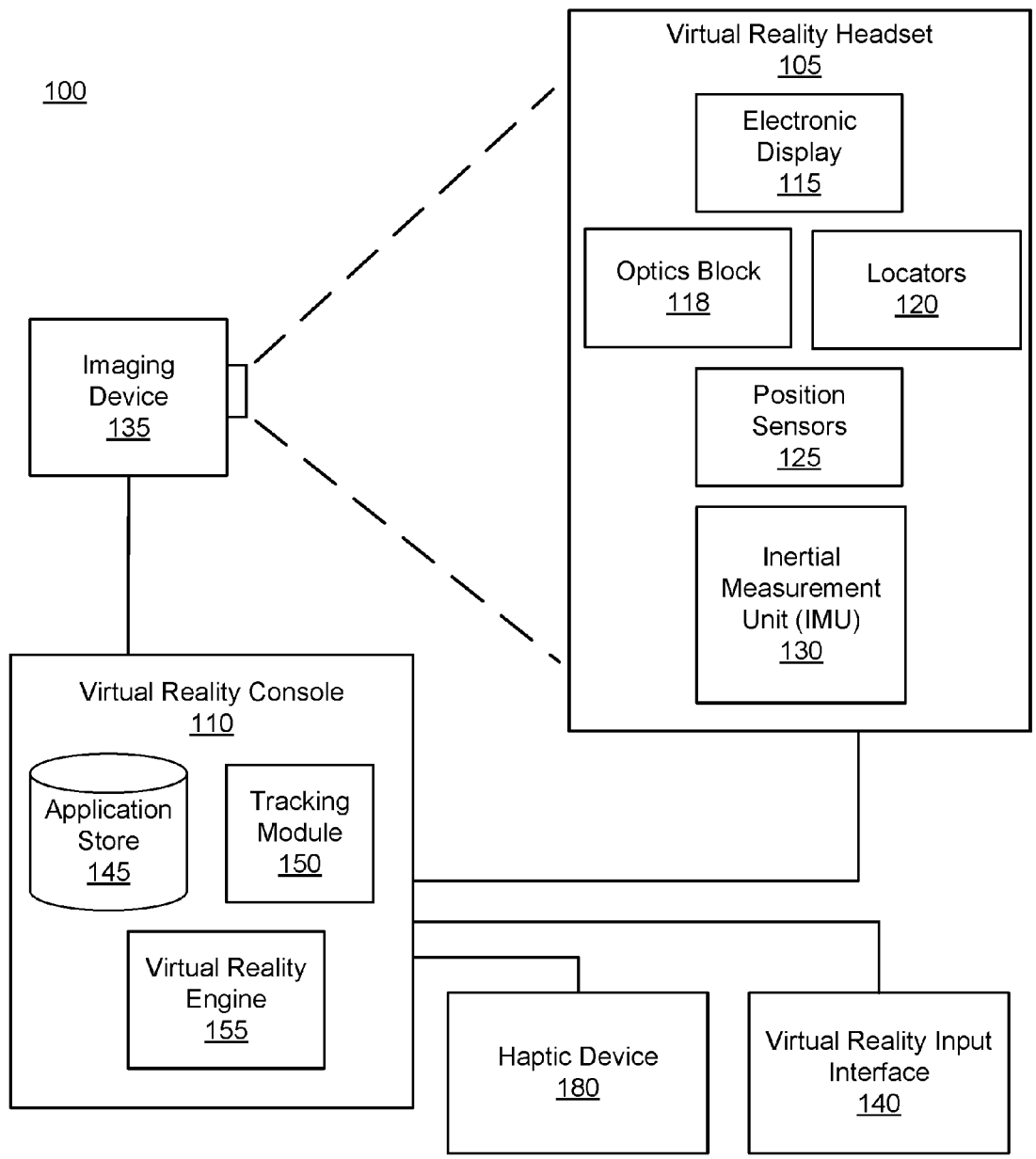
FIG. 1 is a block diagram of a system environment including a virtual reality system, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Embodiments relate to an actuator for providing haptic feedback to a user or a part of a user (e.g., user's hand) on a plate in a controlled direction. The actuator is located on the plate and is configured to apply various excitations to the plate to generate a wave propagating in the controlled direction. The excitations can be a translational motion of the actuator (or a portion of the actuator) in two or three perpendicular axes. Alternatively, the excitations can be a non-translational motion (e.g., rotation about an axis) of the actuator (or a portion of the actuator). By generating the wave traveling in the controlled direction, loss of energy due to scattering of the wave can be obviated.

In one or more embodiments, multiple actuators are placed on the plate and controlled to generate multiple waves. Multiple waves from the multiple actuators can be combined through interference into a single wave and propagated to a destination (e.g., a user) having a desired waveform in a desired direction.

In one or more embodiments, an actuator includes a magnet having at least three surfaces and a body configured to create magnetic field that interacts with magnetic field from the magnet. In one example, the magnet has a first surface coupled to the plate, a second surface facing one end of the body in a slanted direction (or a transversal direction) from a parallel direction of the plate or the orthogonal direction of the plate, and a third surface facing another end of the body in another slanted direction from the parallel direction of the plate or the orthogonal direction of the plate. In this configuration, the magnet can be moved in any direction along a two dimensional space crossing the plate according to magnetic field applied from two ends of the body.

In one or more embodiments, the actuator includes two magnets and two bodies forming a cubic structure. Two magnets are coupled to the plate, and two ends of each body face one of the two magnets. Each of the two bodies is capable of creating magnetic field that interacts with magnetic field from a respective magnet to form a net magnetic field in a transversal direction to the parallel direction of the plate or the orthogonal direction of the plate, thereby imparting force on both bodies. The actuators can be driven with heterogeneous signals or signals delayed in time. In this configuration, the actuator can apply various actuations (e.g., a whipping motion) to the plate to generate a desired wave.

In one aspect, one or more actuators on one side of the plate can be configured to actuate the plate in response to an incoming wave to cancel (or suppress) the incoming wave. This can be performed by generating a destructive interference, or dampening energy of the incoming wave. The one or more actuators can be operated according to a prediction of the wave including, for example, a type of wave, frequency, amplitude, estimated time of arrival of the feedback wave, and etc.

System Overview

FIG. 1 is a block diagram of a virtual reality (VR) system environment 100 in which a VR console 110 operates. The system environment 100 shown by FIG. 1 comprises a VR headset 105, an imaging device 135, a VR input interface 140, and a haptic device 180 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100. Similarly, the functions can be distributed among the components in a different manner than is described here. For example, some or all of the functionality of the VR console 110 may be contained within the VR headset 105.

The VR headset 105 is a head-mounted display that presents media to a user. Examples of media presented by the VR head set include one or more images, video, audio, or any combination thereof. In some embodiments, audio is presented via an external device (e.g., speakers and/or headphones) that receives audio information from the VR headset 105, the VR console 110, or both, and presents audio data based on the audio information.

The VR headset 105 includes an electronic display 115, an optics block 118, one or more locators 120, one or more position sensors 125, and an inertial measurement unit (IMU) 130. The electronic display 115 displays images to the user in accordance with data received from the VR console 110.

The optics block 118 magnifies received light from the electronic display 115, corrects optical errors associated with the image light, and the corrected image light is presented to a user of the VR headset 105. An optical element may be an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retroreflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The haptic device 180 is a device configured to provide haptic feedback to the user. The haptic device 180 is operated according to commands from the VR console 110. Specifically, the haptic device 180 provides actuation that a user can sense, in accordance with the image presented on the VR headset 105. For example, the haptic device 180 vibrates in response to the user encountering an object in a virtual world. The haptic device 180 can be a haptic mat that a user can be located on, as described in detail with respect to FIG. 2. In other embodiments, the haptic device 180 has a smaller form factor and is configured to provide haptic feedback to a hand of the user. In some embodiments, the haptic device 180 can be implemented for providing haptic feedback in an augmented reality.

The VR console 110 provides media to the VR headset 105 for presentation to the user in accordance with information received from one or more of: the imaging device 135, the VR headset 105, and the VR input interface 140. The VR console 110 may also instruct the haptic device 180 (e.g., haptic mat) to provide haptic feedback. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the VR headset 105 or the VR interface 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 150 re-calibrates some or all of the system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. In one example, the VR engine 155 instructs the VR headset 105 to provide visual or audible feedback to the user. In another example, the VR engine 155 instructs the haptic device 180 (e.g., haptic mat) to provide haptic feedback to the user.

Example Virtual Reality System

Figure 2:
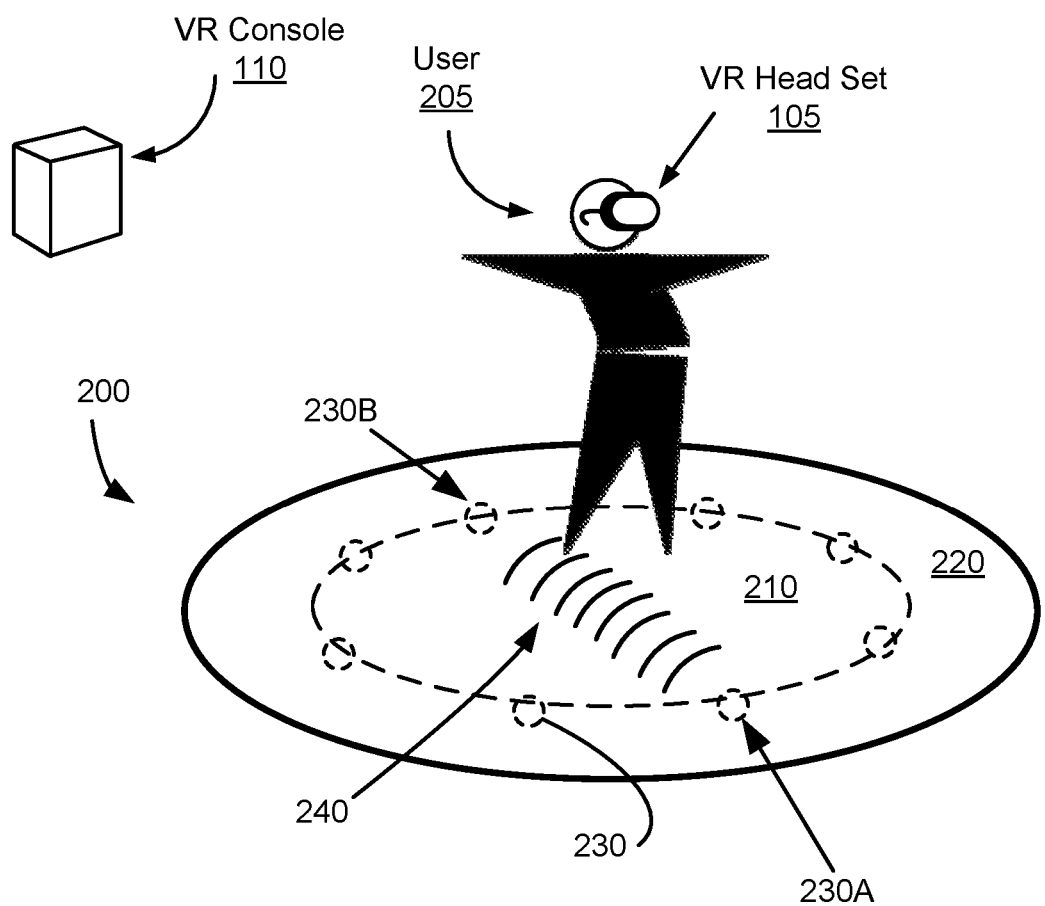
FIG. 2 is a diagram of a user on a haptic mat of the virtual reality system including actuators, in accordance with an embodiment.

FIG. 2 is an example diagram of a user 205 on a haptic mat 200 of the virtual reality system, in accordance with an embodiment. In some embodiments, the haptic mat 200 may be, e.g., the haptic device 180. The user 205 wears the VR headset 105 and views an image of the virtual world provided from the VR console 110, as described in detail with respect to FIG. 1. The haptic mat 200 provides haptic feedback to the user 205 located on the haptic mat 200 in accordance with the image presented on the VR headset 105.

The haptic mat 200 is a surface that provides controlled haptic feedback to a user 205 on the haptic mat 200 according to a control from the VR console 110. The haptic mat 200 includes a center plate 210 and a periphery section 220 circumscribing the center plate 210, and actuators 230. In one example, an edge (or a contour) of the haptic mat 200 is an edge 260 (or a contour) of the periphery section 220 away from the center plate. In different embodiments, the periphery section 220 may be omitted.

The center plate 210 transmits haptic feedback from the haptic mat 200 to the user 205. The center plate 210 may have a circular, elliptical, or some other shape useful for transmitting haptic feedback. The user 205 can be placed on the center plate 210 to receive the haptic feedback. Haptic feedback can be provided from one side of the haptic mat 200 toward another side of the haptic mat 200 through the center plate 210. Preferably, the center plate 210 is rigid such that a haptic feedback wave 240 generated by one or more of the actuators 230 can be propagated through the center plate 210. The center plate 210 is composed of, e.g., aluminum, steel, stainless steel, some other metal, some other material with a stiffness over N/m, or some combination thereof.

In some embodiments, the haptic mat 200 generates haptic feedback via wave field synthesis. Huygens' principle proposes that a singular wavefront can be thought of as a distribution of point sources, whose radial emission of energy through superposition overlay to exactly that wavefront. Using this idea, the haptic mat 200 is able to generate a wave field within the haptic mat 200 with specific 2-D spatial and temporal mechanical vibrations by driving the actuators 230 with a specific phase delay (e.g., depending on array geometry of the actuators 230). Additional details of an example haptic mat are discussed in the Appendix.

The actuators 230 are coupled to the center plate 210 of the haptic mat 200 and provide haptic feedback to the user 205. In one aspect, the actuators 230 are coupled to a bottom surface of the center plate 210, near a perimeter of the center plate 210. The actuators 230 may apply actuations by moving in 6 degrees of freedom. For example, the actuators 230 may move forward/backward, up/down, left/right (translation in three perpendicular axes) combined with rotation about three perpendicular axes (i.e., pitch, yaw, and roll). The actuators 230 are electrically actuated to induce motion in the center plate 210 in accordance with commands from the VR console 110 to generate a haptic feedback wave 240. In some embodiments, some or all of the actuators 230 may also be configured to dampen a haptic feedback wave. For example, In FIG. 2, an actuator 230A may generate the haptic feedback wave 240, and one or more other actuators 230 (e.g., actuator 230B) may be configured to actively dampen the haptic feedback wave 240.

In one embodiment, the actuator 230 suppresses a haptic feedback wave 240 generated by another actuator 230, according to a prediction from the VR console 110. The actuator 230 can be operated according to a prediction from the VR console 110 that causes said another actuator 230 to generate the haptic feedback wave 240. The VR console 110 determines an estimated time of arrival of the haptic feedback wave at the actuator 230 based on the information about the wave generated by said another actuator 230. For example, the VR console obtains a type of wave, frequency, amplitude, of the haptic wave generated, predicts the estimated time of arrival, and configures the actuator 230 to suppress the haptic feedback wave through specific excitations to counteract the haptic feedback wave at the predicted time. In some embodiments, a feedback based control mechanism, e.g., impedance regulated by an Opamp active filter, may be employed to drive actuators to actively suppress the waves created by other actuators without the VR console 110.

Figure 3A:
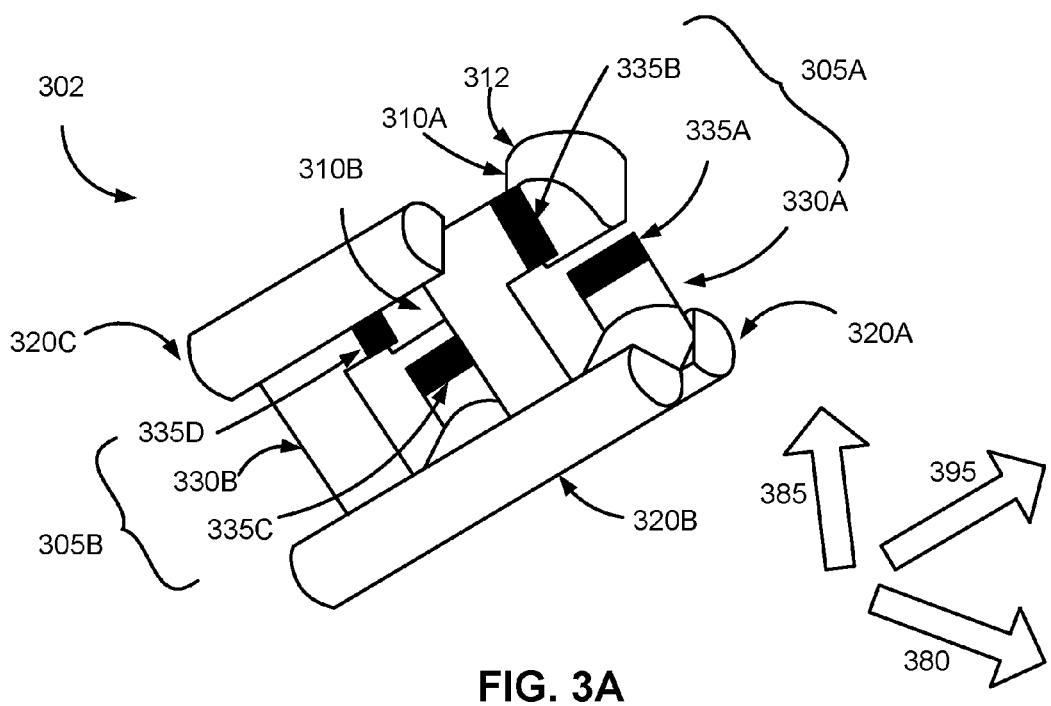
FIG. 3A is a perspective view of an example actuator, in accordance with an embodiment.

FIG. 3A is a perspective view of an actuator 302, in accordance with an embodiment. In some embodiments, the actuator 302 may be, e.g., the actuator 230 of FIG. 2. In some embodiments, the actuator 302 includes two magnets 310A and 310B. In addition, the actuator 302 includes a first body 305A configured to create magnetic field to interact with magnetic field of the first magnet 310A and a second body 305B configured to create magnetic field to interact with magnetic field of the second magnet 310B. The first body 305A includes a first elongated member 330A composed of magnetic material (e.g., ferrite material) and coils 335A and 335B coupled to the first elongated member 330A. Similarly, the second body 305B includes a second elongated member 330B composed of magnetic material (e.g., ferrite material) and coils 335C and 335D coupled to the second elongated member 330B. The first body 305A and the second body 305B are coupled to each other through connecting members 320A, 320B, and 320C. In other embodiments, the actuator 302 includes different, more or fewer components than shown in FIG. 3A.

In one embodiment, the first body 305A, the second body 305B, and the connecting members 320A, 320B, and 320C form a cubic structure as shown in FIG. 3A. For example, the third connecting member 320C faces the first connecting member 320A in the horizontal direction 380, and the second connecting member 320B faces the magnets 310A and 310B in the vertical direction 385, where each of the connecting members 320A, 320B, and 320C is elongated in a direction 395 orthogonal to the horizontal direction 380 and the vertical direction 385 to couple the first body 305A facing the first magnet 310A and the second body 305B facing the second magnet 310B.

Each magnet 310 (i.e., 310A and 310B) is coupled to the haptic mat 200, and configured to inject vibrations (or mechanical excitations) to the haptic mat 200 according to the magnetic field applied to each magnet 310. Specifically, the magnet 310 is pushed or pulled according to the magnetic pole of the magnet 310 and the magnetic field applied from a corresponding body 305. Preferably, the first magnet 310A and the second magnet 310B have similar shapes but opposite facing magnetic polarities. Alternatively, the first magnet 310A and the second magnet 310B may have the same magnetic pole. In some embodiments, the magnets 310 are implemented as permanent magnets with fixed magnetic poles. In other embodiments, one or more of the magnets 310 are implemented as electromagnets that are programmable.

Figure 3B:
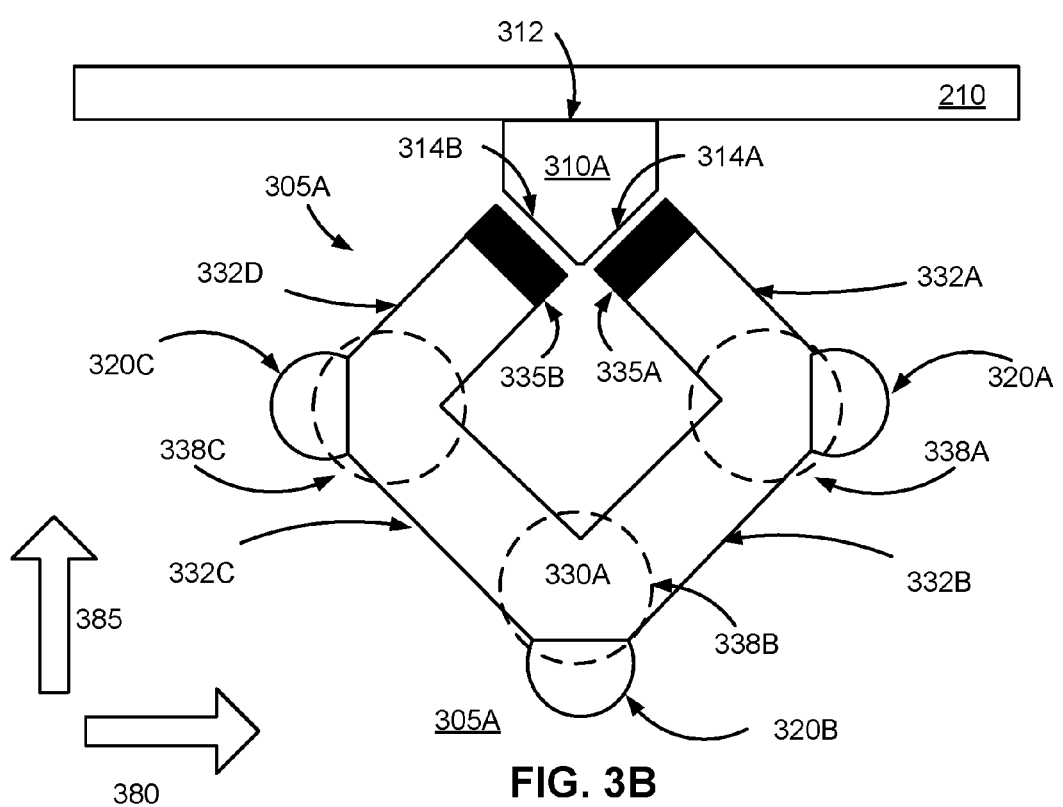
FIG. 3B is a front view of the actuator of FIG. 3A, in accordance with an embodiment.

FIG. 3B is a front view of the actuator 302 of FIG. 3A, in accordance with an embodiment. The first magnet 310A includes a top portion including a top surface 312, and a bottom portion including a first bottom surface 314A and a second bottom surface 314B. As shown in FIG. 3B, the top surface 312 of the first magnet 310A is coupled to a surface (e.g., a bottom surface or a top surface) of the center plate 210. In one implementation, the top portion of the first magnet 310A has a cylindrical shape, where the top surface 312 of the first magnet 310A is coupled to a bottom surface of the haptic mat 200. The bottom portion of the first magnet 310A includes the first bottom surface 314A facing a first end of the first body 305A in a slanted direction of the vertical direction 385. The bottom portion of first magnet 310A also includes a second bottom surface 314B facing a second end of the first body 305A in another slanted direction of the vertical direction 385. Each of the bottom surfaces 314A, 314B faces a respective end of the first body 305A in a direction transverse to the orthogonal direction (i.e., vertical direction 385) of the top surface 312 as shown in FIG. 3B.

The second magnet 310B has a similar structure of the first magnet 310A, hence the detailed description thereof is omitted herein for the sake of brevity. The first magnet 310A and the second magnet 310B with the structure described above can move in a horizontal direction 380 parallel to the top surface 312 of the magnet, a vertical direction 385 perpendicular to the horizontal direction 380 of FIG. 3B, or any combination thereof.

In one aspect, the first body 305A creates magnetic fields with a net magnetic force that may not be aligned with facing directions of two ends of the first elongated member 330A. The first body 305A includes a first elongated member 330A composed of the magnetic material (e.g., ferrite material) and coils 335A and 335B coupled to each end of the first body 305A. According to the current supplied to a coil 335, a corresponding magnetic field can be created at a bottom surface of the first magnet 310A facing the end coupled to the coil 335.

In one embodiment, the first elongated member 330A includes four portions 332A, 332B, 332C, and 332D to create magnetic fields with a net magnetic force that may not be aligned with facing directions of two ends of the first elongated member 330A. In one implementation, the first elongated member 330A is structured where: one end of the first portion 332A is coupled to the first end of first elongated member 330A; another end of the first portion 332A is coupled to one end of the second portion 332B through a first joint 338A; another end of the second portion 332B is coupled to one end of the third portion 332C through a second joint 338B; another end of the third portion 332C is coupled to one end of a fourth portion 332D through a third joint 338C; and another end of the fourth portion 332D is coupled to the second end of the first elongated member 330A, in a manner that both ends of the first elongated member 330A face the first magnet 310A. The first portion 332A and the third portion 332C may be disposed in parallel to each other, and the second portion 332B and the fourth portion 332D may be disposed in parallel to each other. Preferably, each portion 332 is coupled to another portion 332 in a perpendicular direction at a corresponding joint. Alternatively, each portion 332 is coupled to another portion 332 in a non-perpendicular direction, while both ends of the first elongated member 330A face the first magnet 310A. In another aspect, the first elongated member 330A has a horse hoof shape.

The second elongated member 330B has a similar configuration as the first elongated member 330A to create magnetic fields with a net magnetic force that may not be aligned with facing directions of two ends of the second elongated member 330B. Therefore, the detailed description thereof is omitted herein for the sake of brevity.

Figure 3C:
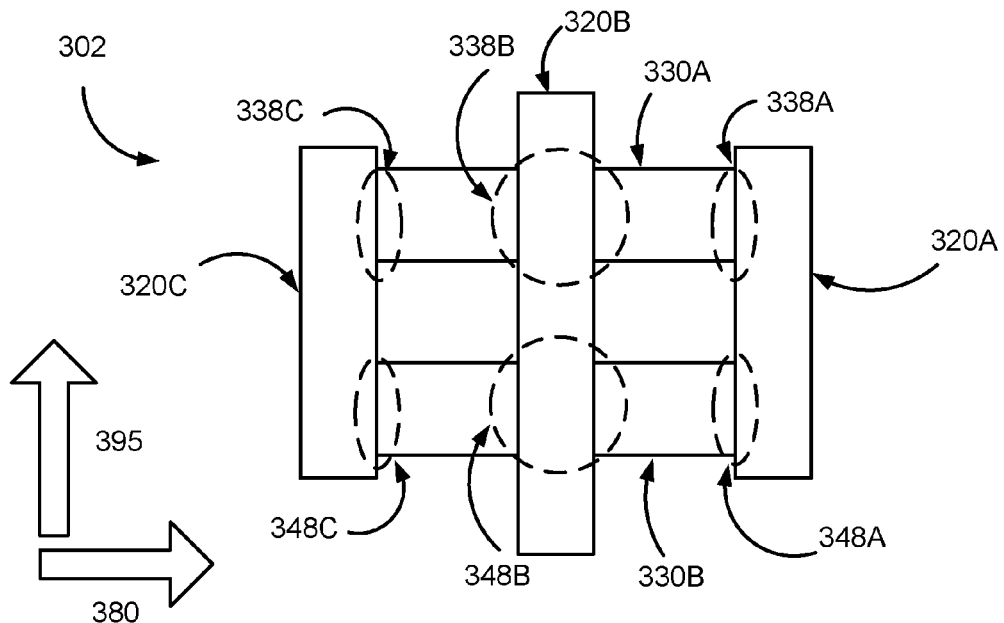
FIG. 3C is a bottom plan view of the actuator of FIG. 3A, in accordance with an embodiment.

FIG. 3C is a bottom plan view of the actuator of FIG. 3A, in accordance with an embodiment. In one embodiment, the first elongated member 330A and the second elongated member 330B are coupled to each other through connecting members 320A, 320B, and 320C. The connecting members 320A, 320B, and 320C are elongated in a direction 395 orthogonal to the vertical direction 385 and the horizontal direction 380. Each connecting member 320 is coupled to a joint 338 of the first elongated member 330A and a corresponding joint 348 of the second elongated member 330B. Specifically, one side of the first connecting member 320A is coupled to the first joint 338A of the first elongated member 330A and another side of the first connecting member 320A is coupled to a first joint 348A of the second elongated member 330B. Similarly, one side of the second connecting member 320B is coupled to the second joint 338B of the first elongated member 330A and another side of the second connecting member 320B is coupled to a second joint 348B of the second elongated member 330B. Moreover, one side of the third connecting member 320C is coupled to the third joint 338C of the first elongated member 330A and another side of the third connecting member 320C is coupled to a third joint 348C of the second elongated member 330B. Accordingly, the first body 305A, the second body 305B, and the connecting members 320A, 320B, 320C form a cubic crystal structure as shown in FIG. 3A.

Figure 3D:
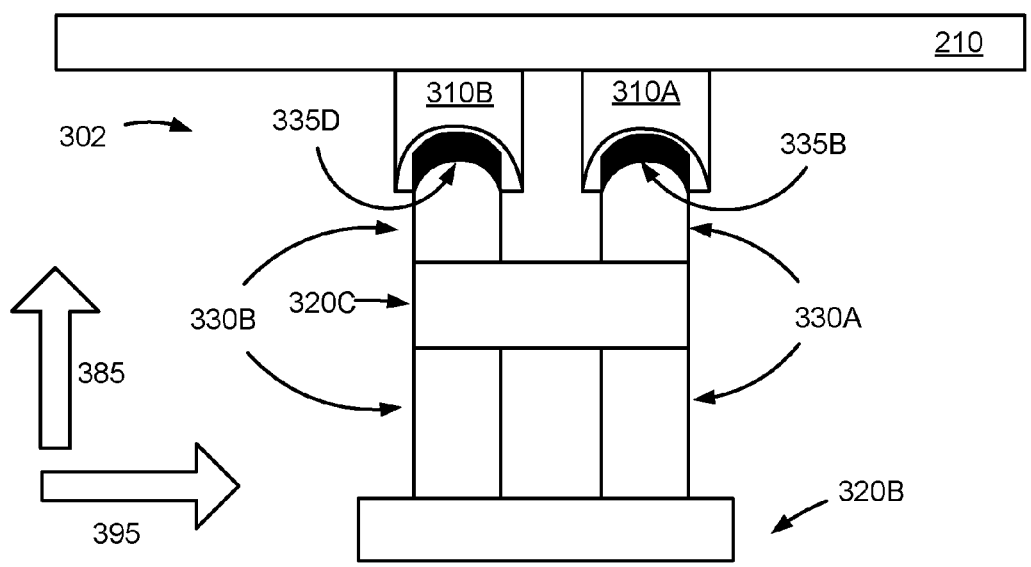
FIG. 3D is a side view of the actuator of FIG. 3A, in accordance with an embodiment.

FIG. 3D is a side view of the actuator 302 of FIG. 3A, in accordance with an embodiment. In FIG. 3D, a side of the actuator 302 of FIG. 3A with the connecting member 320C coupled to the first elongated member 330A and the second elongated member 330B is shown. The magnets 310A and 310B are coupled to the center plate 210. The first magnet 310A moves according to magnetic field induced by current flowing through the coil 335B and the coil 335A (not shown in FIG. 3D). Similarly, the second magnet 310B moves according to magnetic field induced by current flowing through the coil 335D and the coil 335C (not shown in FIG. 3D). The first magnet 310A and the second magnet 310B move in phase or out of phase according to current supplied through coils 335 to generate a desired wave as described below.

Example Excitations

The actuator 302 disclosed herein can apply various excitations to the haptic mat 200 by moving the magnets 310A and 310B, according to current applied to the coils 335. The actuator 302 can inject, for example, a vertical sync excitation, horizontal sync excitation, vertical tilt excitation, horizontal tilt excitation, or a combination of thereof to the haptic mat 200. The vertical sync excitation herein refers to a translational motion of the magnets 310A and 310B in the vertical direction 385 or an opposite direction of the vertical direction 385 together. The horizontal sync excitation herein refers to a translational motion of the magnets 310A and 310B in the horizontal direction 380 or an opposite direction of the horizontal direction 380 together. The vertical tilt excitation herein refers to a translational motion of one of the magnets 310A and 310B in the vertical direction 385 and the other of the magnets 310A and 310B in the opposite direction of the vertical direction 385. The horizontal tilt excitation herein refers to a translational motion of one of the magnets 310A and 310B in the horizontal direction 380 and the other of the magnets 310A and 310B in the opposite direction of the horizontal direction 380.

In one aspect, the actuator 302 applies the vertical sync excitation by moving the magnets 310A and 310B in the vertical direction 385. Specifically, the magnets 310A and 310B can move up in the vertical direction 385 or down in the opposite direction of the vertical direction 385 together by supplying current to the coils 335A, 335B, 335C, and 335D in phase.

Similarly, the actuator 302 applies the horizontal sync excitation by moving the magnets 310A and 310B in the horizontal direction 380. Specifically, the magnets 310A and 310B can move in the horizontal direction 380 or in the opposite direction of the horizontal direction 380 together by supplying current to the coils 335A, and 335C in phase, and to the coils 335B, and 335D out of phase.

In another aspect, the actuator 302 applies the vertical tilt excitation by moving one of the magnets 310A and 310B in the vertical direction 385, and the other of the magnets 310A and 310B in the opposite direction of the vertical direction 385. Hence, the magnets 310A and 310B can be actuated like a seesaw in the vertical direction 385 by supplying current to the coils 335A and 335B in phase, and to the coils 335C and 335D out of phase.

Yet in another aspect, the actuator 302 applies the horizontal tilt excitation by moving one of the magnets 310A and 310B in the horizontal direction 380, and the other of the magnets 310A and 310B in the opposite direction of the horizontal direction 380. Hence, the magnets 310A and 310B can be actuated like a seesaw in the horizontal direction 380 by supplying current to the coils 335A and 335D in phase, and to the coils 335B and 335C out of phase.

Although four types of excitations are described above, the actuator 302 can simultaneously perform two or more excitations described above to control the movement of the magnets 310 by controlling magnitude, frequency, and a phase of current supplied to each coil 335.

Advantageously, the actuator 302 having the cubic crystal structure as disclosed herein can apply transversal excitation, thereby allowing the wave to propagate in a specific direction. For example, through various combinations of the excitations listed above, the actuator 302 can generate a forward traveling wave by applying a whipping actuation on the haptic mat 200. As a result, the wave can be propagated in a controlled direction without energy being scattered.

Moreover, the actuator 302 can be configured to suppress the wave generated from another actuator according to a prediction from the VR console 110. Accordingly, damping elements to reduce reflection of the haptic feedback wave may be eschewed.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An actuator comprising:
a first magnet having a pole, the first magnet coupled to a plate of a haptic mat; and
a first body, the first body comprising:
a first elongated member that is entirely composed of a magnetic material, a first end of the first elongated member facing a first surface of the first magnet, a second end of the first elongated member facing a second surface of the first magnet, a first coil coupled to the first end of the first elongated member, and a second coil coupled to the second end of the first elongated member, wherein the first coil and the second coil are configured to be driven with a first electric current and a second electric current, respectively, that together induce a magnetic field within the first elongated member to cause a motion of the first magnet relative to the first body, the motion of the first magnet generating a portion of a haptic feedback wave within the plate.

2. The actuator of claim 1, further comprising:
a second magnet having another pole, the second magnet coupled to the plate of the haptic mat; and a second body, the second body comprising:
a second elongated member that is entirely composed of the magnetic material, a first end of the second elongated member facing a first surface of the second magnet, a second end of the second elongated member facing a second surface of the second magnet, a third coil coupled to the first end of the second elongated member, and a fourth coil coupled to the second end of the second elongated member, wherein the third coil and the fourth coil are configured to be driven with a third electric current and a fourth electric current, respectively, that together induce another magnetic field within the second elongated member to cause a motion of the second magnet relative to the second body, the motion of the second magnet together with the motion of the first magnet generating another portion of the haptic feedback wave within the plate.

3. The actuator of claim 2, wherein a third end of the first body disposed away from the first magnet is coupled to a third end of the second body disposed away from the second magnet.

4. The actuator of claim 3, wherein the first body and the second body are coupled to each other to form a ferrite.

5. The actuator of claim 2, wherein the first body comprises a first joint, a second joint, and a third joint, and wherein the second body comprises a fourth joint, a fifth joint, and a sixth joint, the actuator further comprising:
a first connecting member coupled to the first joint of the first body and the fourth joint of the second body;
a second connecting member coupled to the second joint of the first body and the fifth joint of the second body; and
a third connecting member coupled to the third joint of the first body and the sixth joint of the second body.

6. The actuator of claim 5, wherein a portion of the first elongated member between the first end of the first elongated member and the first joint is parallel to a portion of the first elongated member between the second joint and the third joint, and wherein a portion of the first elongated member between the second end of the first elongated member and the third joint is parallel to a portion of the first elongated member between the first joint and the second joint.

7. The actuator of claim 5, wherein a portion of the second elongated member between the first end of the second elongated member and the fourth joint is parallel to a portion of the second elongated member between the fifth joint and the sixth joint, and wherein a portion of the second elongated member between the second end of the second elongated member and the sixth joint is parallel to a portion of the second elongated member between the fourth joint and the fifth joint.

8. The actuator of claim 5, wherein the first connecting member, the second connecting member, and the third connecting member are parallel to each other.

9. A method for providing haptic feedback to a haptic mat, comprising:
applying a first electric current to a first coil and a second electric current to a second coil, the first coil coupled to a first end of a first elongated member that is entirely composed of a magnetic material, the second coil coupled to a second end of the first elongated member, the first end of the first elongated member facing a first surface of a first magnet, the second end of the first elongated member facing a second surface of the first magnet, the first electric current applied to the first coil and the second electric current applied to the second coil configured to move the first magnet away from the first end and the second end of the first elongated member.

10. The method of claim 9, further comprising:
applying a third electric current to a third coil and a fourth electric current to a fourth coil, the third coil coupled to a first end of a second elongated member that is entirely composed of a magnetic material, the fourth coil coupled to a second end of the second elongated member, the first end of the second elongated member facing a first surface of a second magnet, the second end of the second elongated member facing a second surface of the second magnet, the third electric current applied to the third coil and the fourth electric current applied to the fourth coil configured to move the second magnet towards the first end and the second end of the second elongated member, wherein the first elongated member and the second elongated member are coupled to each other through a connecting member.

11. The method of claim 9, further comprising:
applying a third electric current to a third coil and a fourth electric current to a fourth coil, the third coil coupled to a first end of a second elongated member, the fourth coil coupled to a second end of the second elongated member, the first end of the second elongated member facing a first surface of a second magnet, the second end of the second elongated member facing a second surface of the second magnet, the third electric current applied to the third coil and the fourth electric current applied to the fourth coil configured to move the second magnet away from the first end and the second end of the second elongated member, wherein the first elongated member and the second elongated member are coupled to each other through a connecting member.

12. An actuator comprising:
a first magnet having a pole, the first magnet coupled to a plate;
a first body, the first body comprising:
a first elongated member that is entirely composed of a magnetic material,
a first end of the first elongated member facing a first surface of the first magnet, a second end of the first elongated member facing a second surface of the first magnet,
a first coil coupled to the first end of the first elongated member, and
a second coil coupled to the second end of the first elongated member;
a second magnet having another pole, the second magnet coupled to the plate; and
a second body, the second body comprising:
a second elongated member that is entirely composed of a magnetic material, a first end of the second elongated member facing a first surface of the second magnet, a second end of the second elongated member facing a second surface of the second magnet, a third coil coupled to the first end of the second elongated member, and a fourth coil coupled to the second end of the second elongated member,
wherein the first coil and the second coil are configured to be driven with a first electric current and a second electric current, respectively, that together induce a magnetic field within the first elongated member to cause a motion of the first magnet relative to the first body, the motion of the first magnet generating a portion of a mechanical wave within the plate, and
wherein the third coil and the fourth coil are configured to be driven with a third electric current and a fourth electric current, respectively, that together induce another magnetic field within the second elongated member to cause a motion of the second magnet relative to the second body, the motion of the second magnet together with the motion of the first magnet generating another portion of the mechanical wave within the plate.

13. The actuator of claim 12, wherein a third end of the first body disposed away from the first magnet is coupled to a third end of the second body disposed away from the second magnet.

14. The actuator of claim 13, wherein the first body and the second body are coupled to each other to form a ferrite.

15. The actuator of claim 12, wherein the first body comprises a first joint, a second joint, and a third joint, and wherein the second body comprises a fourth joint, a fifth joint, and a sixth joint, the actuator further comprising:
a first connecting member coupled to the first joint of the first body and the fourth joint of the second body;
a second connecting member coupled to the second joint of the first body and the fifth joint of the second body; and
a third connecting member coupled to the third joint of the first body and the sixth joint of the second body.

16. The actuator of claim 15, wherein a portion of the first elongated member between the first end of the first elongated member and the first joint is parallel to a portion of the first elongated member between the second joint and the third joint, and wherein a portion of the first elongated member between the second end of the first elongated member and the third joint is parallel to a portion of the first elongated member between the first joint and the second joint.

17. The actuator of claim 15, wherein a portion of the second elongated member between the first end of the second elongated member and the fourth joint is parallel to a portion of the second elongated member between the fifth joint and the sixth joint, and wherein a portion of the second elongated member between the second end of the second elongated member and the sixth joint is parallel to a portion of the second elongated member between the fourth joint and the fifth joint.

18. The actuator of claim 15, wherein the first connecting member, the second connecting member, and the third connecting member are parallel to each other.

* * * * *